United States Patent Office 3,409,643
Patented Nov. 5, 1968

3,409,643
PROCESS FOR THE PREPARATION OF 17α-ALKYNL-17β-ALKANOYLOXY STEROIDS OF THE ANDROSTANE AND ESTRANE SERIES
Elliot L. Shapiro, Cedar Grove, N.J., assignor to Schering Corporation, Bloomfield, N.J., a corporation of New Jersey
No Drawing. Filed Mar. 11, 1966, Ser. No. 533,435
10 Claims. (Cl. 260—397.5)

ABSTRACT OF THE DISCLOSURE

A novel process for the preparation of 17α-alkynyl-17β-alkanoyloxy steroids of the androstane and estrane series comprises subjecting a 17-keto steroid of the androstane and estrane series to the action of an alkali metal acetylide and adding in situ to the 17α-alkynyl-17β-hydroxy metal salt intermediate thereby formed, an acylating agent selected from the group consisting of a lower alkanoyl anhydride and a lower alkanoyl halide.

This process advantageously performs concomitantly both an alkynation and esterification reaction and provides a method for preparing an ester of a tertiary alcohol under mild conditions in a medium which will not effect functional groups or systems which are highly reactive or sensitive to vigorous conditions or strongly acidic and strongly basic media.

This process is of particular use in the conversion of 3-methoxy - 2,5(10) - esteradien-17-one to 3-methoxy-17α-ethinyl - 2,5(10) - esteradien-17β-ol 17-acetate, a known, valuable intermediate.

---

This invention relates to a novel process and to novel intermediates produced thereby.

The invention sought to be patented is described as residing in the concept of preparing a 17α-alkynyl-17β-alkanoyloxy steroid of the androstane and estrane series by subjecting a 17-keto steroid of the androstane and estrane series to the action of an alkali metal acetylide and adding in situ to the 17α-alkynyl-17β-hydroxy metal salt intermediate thereby formed, an acylating agent selected from the group consisting of a lower alkanoyl anhydride and a lower alkanoyl halide.

Heretofore, the conversion of a 17-keto steroid to a 17α-alkynyl - 17β - alkanoyloxy steroid involved a multi-step process; namely, the preparation of a 17α-alkynyl-17β-hydroxy steroid intermediate by reaction of a 17-keto-steroid with an alkynating agent (e.g. an alkali metal acetylide), followed by the addition of water, isolation of the 17α-alkynyl-17β-hydroxy steroid thereby formed, and then esterification thereof under the vigorous conditions (i.e. high temperatures and/or in strongly acidic mediums) necessary in prior art methods for the esterification of tertiary alcohols. By the process of this invention, the alkynation and esterification are performed concomitantly so that the conversion of a 17-keto steroid to a 17α-alkynyl-17β-lower alkanoyloxy steroid is effected in one operation, thus advantageously eliminating the steps of preparing per se and isolating the 17α-alkynyl-17β-hydroxy steroid intermediate required in prior art methods.

Additionally, by my process, whereby an acylating agent (e.g. a lower alkanoyl anhydride or a lower alkanoyl halide) is added in situ to a 17α-alkynyl-17β-hydroxy metal salt intermediate, it is now possible to prepare an ester of the tertiary alcohol at C–17 under mild conditions (i.e. at room temperatures, and in a medium which is, in effect, non-reactive, i.e. does not cause transformations usually effected by strongly acidic or strongly basic media). The process of this invention is thus a method of choice when preparing esters at C–17 of 17α-alkynyl-17β-hydroxy steroids and particularly of those steroids which also possess functions or systems (e.g. 3-methoxy-$\Delta^{2,5(10)}$- and 3-ethoxy-$\Delta^{3,5}$-) which are highly reactive or sensitive to the vigorous conditions of prior art methods for esterifying a tertiary hydroxyl group. Thus, for example, the preparation of 3-methoxy-17α-ethinyl-2,5(10)-esteradien-17β-ol 17-acetate (an intermediate in the preparation of therapeutically valuable 19-nor steroids) via methods known in the art involves reacting 3-methoxy-17α-ethinyl-2,5(10)-estradien-17β-ol with acetic anhydride in pyridine at elevated temperatures or with acetyl chloride in pyridine. Both the aforementioned reaction mediums cause competing reactions involving destruction of the existing A-ring system such as conversion of the 3-methoxy-$\Delta^{2,5(10)}$- system to a 3-keto-19-nor-$\Delta^4$- system or to an aromatic A-ring system (i.e. 3-methoxy-$\Delta^{1,3,5(10)}$) so that only a small yield of the desired 3-methoxy-17α-ethinyl-2,5(10)-estradien-17β-ol 17-acetate is formed. By my invention, however, 3-methoxy-17α - ethinyl-2,5(10)-estradien-17β-ol 17-acetate is conveniently prepared via a one vessel process in good yields from 3-methoxy-2,5(10)-estradien-17-one by reaction thereof with sodium acetylide in dimethylformamide followed by treatment with acetic anhydride. The 3-methoxy - 17α - ethinyl-2,5(10)-estradien-17β-ol 17-acetate thereby formed, upon reaction with mild acid, e.g. oxalic acid, is converted to 17α-ethinyl-5(10)-estren-17β-ol 17-acetate which when subjected to the action of oxygen according to procedures known in the art, yields 10β-hydroperoxy-17α-ethinyl-19-nor-4-androsten-17β-ol 17-acetate, a compound demonstrating anti-fertility activity.

In general, when carrying out my process, an alkali metal acetylide, e.g., sodium acetylide, is added to a 17-keto steroid of the androstane and pregnane series, e.g., 5-androsten-3β-ol 17-one and 3-methoxy-2,5(10)-estradien-17-one, in a non-interfering solvent, preferably one having a high dielectric constant (e.g., dimethylformamide) under an atmosphere of nitrogen, the quantity of alkali metal acetylide usually being from 1 to 3 moles per mole of 17-keto steroid. To the 17α-ethinyl-17β-hydroxy steroidal 17-sodium salt intermediate thereby formed, e.g., 17α-ethinyl-5-pregnene-3β,17β-diol 17-sodium salt and 3-methoxy-17α-ethinyl-2,5(10)-estradien-17β-ol sodium salt, respectively, there is added, in situ, an acylating agent, e.g., acetic anhydride or acetyl chloride, the molar quantity of acylating agent being at least equivalent (and usually in slight excess) to that of the alkynating agent. The resulting 17α-ethinyl-17β-alkanoyloxy steroid, e.g., 17α-ethinyl-5-androstene-3β,17β-diol diacetate and 3-methoxy-17α-ethinyl-2,5(10)-estradien-17β-ol 17-acetate, is conveniently isolated by pouring the reaction mixture into a large volume of water and collecting the 17α-ethinyl-17β-alkanoyloxy derivative by conventional means such as by filtration or extraction with an organic solvent. Purification is effected by methods known in the art such as recrystallization and chromatographic techniques.

My process is preferably carried out under an atmosphere of an inert gas such as argon and nitrogen, and at ambient temperatures, although the temperature range may be from about 0° C. to about 50° C. provided the solvent medium is above its melting point. Non-interfering solvents useful in our process are preferably solvents having high dielectric constants including N,N-disubstituted alkanoic acid amides such as dimethylformamide, dimethylacetamide, as well as cyclic amides such as N-methyl-2-pyrrolidone. Ethers such as tetrahydrofuran and dioxane are also useful as solvents for my process.

The alkynating agents conveniently used in my process are alkali metal acetylides which term (as used throughout the instant specification and claims) includes lithium and sodium acetylide whereby, together with the in situ addition of an alkanoyl anhydride or halide, are prepared 17α-ethinyl-17β-alkanoyloxy derivatives, as well as substituted alkali metal acetylides, and, in particular, alkyl-substituted and halogeno-substituted alkali metal acetylides, such as sodium methyl acetylide, lithium chloroacetylide, and lithium bromoacetylide, whereby, together with the in situ addition of an alkanoyl anhydride or halide, are prepared 17α-methylethinyl-, 17α-chloroethinyl-, and 17α-bromoethinyl-17β-alkanoyloxy derivatives, respectively.

Acylating agents contemplated for use in the process sought to be patented are anhydrides and halides of carboxylic acids having up to 8 carbon atoms including the anhydride and acid halides of lower alkanoic acids such as acetic acid, propionic acid, t-butyric acid, valeric acid, and of aryl carboxylic acids such as benzoic and toluic acids, and the like. When an alkanoic acid derivative having up to 4 carbon atoms is desired, an acid anhydride is the acylating agent of choice.

The concomitant alkynation and esterification is completed within a very short time, the alkynation usually being completed within approximately a half-hour when the solvent is a disubstituted alkanoic acid amide and within about three hours when tetrahydrofuran is used as solvent. After addition of the acylating agent to the alkynated reaction mixture in situ, only a short reaction time is usually required (and sometimes but a minute or two) prior to pouring the reaction mixture into water and isolating the resulting product.

My process finds its greatest usefulness in the preparation of 17α-alkynyl-17β-alkanoyloxy derivatives of steroids containing acid sensitive function, such as described hereinabove. In general, however, any 17-keto steroid of the androstane and estrane series may be subjected to the action of an alkynating agent followed by the in situ addition of a lower alkanoic anhydride or halide and there will be formed a 17α-alkynyl-17β-lower alkanoyloxy steroid of the androstane and estrane series.

Included among the 17-keto estranes useful as starting compounds are 3 - methoxy - 2,5(10) - estradien-17-one, estrone, and methyl analogs of estrone such as 1,2-dimethylestrone, 2-methylestrone, 16β-methylestrone, 6β-methylestrone; unsaturated analogs thereof such as 6-dehydroestrone, 1-methyl-6-dehydroestrone, 1,2-dimethyl-6-dehydroestrone, 6-methyl-6-dehydroestrone, 7-dehydroestrone (equilin), 6,8-bis-dehydroestrone (equilenin); hydroxylated derivatives and ethers thereof such as 6β-methyl - 7α - hydroxyestrone, 11β-hydroxyestrone, 1-methoxyestrone and 2-methoxyestrone.

Some 17-keto androstanes useful as starting compounds are 5-androsten-3β-ol-17-one, 4-androstene-3,11,17-trione, 16β-methyl-19-nor-4-androstene-3,17-dione, 4-androstene-3,17-dione, 4-androstene-3β-ol - 17 - one, 19-nor-4-androstene-3,17-dione, 5-androsten-3α-ol-17-one, 1,4,6-androstatriene-3,11,17-trione, 5-androstene-1α,3β - diol-17-one, 6-fluoro (α and β)-4-androsten-17-one, 19-nor-4-androstene-11,17-dione, 4 - androstene - 11,17 - dione, 11β-hydroxyandrostan-17-one, 1,4-androstadiene-3,17-dione.

When it is desired that an ether derivative be present in a 17α-alkynyl-17β-lower alkanoyloxy androstane or estrane prepared by my process, the hydroxyl functions in the 17-keto starting steroid, e.g. as in estrone (3-hydroxy-1,3,5(10)-estratrien-17-one) are preferably converted to their ether derivatives (e.g. estrone methyl ether) prior to reaction with sodium acetylide in dimethylformamide followed by acetic anhydride (for example) to obtain the corresponding 17α-alkynyl-17β-lower alkanoyloxy derivative thereof, e.g. 17α-ethinylestradiol 3-methyl ether 17-acetate.

When preparing 17α-alkynyl-17β-lower alkanoyloxy estranes and androstanes having free hydroxyl functions, the hydroxylated 17-keto starting steroids of the estrane and androstane series are conveniently converted to their tetrahydropyranyl ether derivatives prior to concomitant alkynation and esterification at C–17. Treatment of the tetrahydropyranyl ether derivatives of the 17α-alkynyl-17β-alkanoyloxy compounds thereby formed with dilute acid removes the tetrahydropyranyl ether function with ease to yield the free hydroxy analogs. Thus, for example, estrone and 5-androsten-3β-ol-17-one, upon reaction with dihydropyran in the presence of a strong acid such as p-toluenesulfonic acid (according to known procedures) will give the corresponding tetrahydropyranyl ether derivatives, e.g. estrone 3-tetrahydropyranyl ether and 5-androsten-3β-ol-17-one 3-tetrahydropyranyl ether. Reaction of each of the foregoing with sodium acetylide in dimethylformamide followed by the in situ addition of acetic anhydride will yield 17α-ethinylestradiol 3-tetrahydropyranyl ether 17-acetate and 17α-ethinyl-5-androstene-3β,17β-diol 3-tetrahydropyranyl ether 17-acetate, respectively. After the isolation of these derivatives (i.e. after the addition of water to the reaction medium and filtration or extraction thereof) the addition of acetic acid or hydrochloric acid to the derivative in aqueous alcohol will remove the tetrahydropyranyl group and there is obtained the free hydroxylated derivative, e.g. 17α-ethinyl estradiol 17-acetate and 5-androstene-3β,17β-diol 17-acetate, respectively.

Hydroxyl functions in the 17-keto-androstane and 17-keto-estrane starting steroids which are not protected prior to alkynation and esterification at C–17, are transformed to their lower alkanoate ester derivatives under the conditions of my process. Thus, treatment of estrone and 5-androsten-3β-ol-17-one with sodium acetylide in dimethylformamide followed by acetic anhydride, and isolation of the thereby formed 17α-ethinyl-17β-acetoxy derivatives by the addition of water followed by extraction and recrystallization will yield 17α-ethinyl estradiol diacetate and 17α-ethinyl-5-androstene-3β,17β-diol diacetate, respectively. When preparing 17α-alkynyl-17β-alkanoyloxy estranes and androstanes containing other esterified hydroxyl groups, the quantity of alkanoic acid anhydride which is to be added in situ should be increased by about one mole for each free hydroxyl group to ensure complete esterification of the resulting product. The esters of primary and secondary alcohols in the 17α-alkynyl-17β-acyloxy derivatives thus prepared may be converted to the corresponding free hydroxyl functions by preferential hydrolysis according to procedures known in the art. Thus 17α-ethinylestradiol diacetate and 17α-ethinyl-5-androstene-3β,17β-diol diacetate upon treatment with a half-molar quantity of sodium carbonate in aqueous methanol yields 17α-ethinylestradiol 17-acetate and 17α-ethinyl-5-androstene-3β,17β-diol 17-acetate, respectively.

When the hydroxyl functions in the starting 17-keto-androstane or 17-keto estrane are hindered secondary or tertiary and, in carrying out my process, there is employed a molar quantity of acylating agent approximately equivalent to that of alkylating agent, there is obtained a 17α-alkynyl-17β-acyloxy-androstane or estrane possessing unesterified secondary or tertiary hydroxyl functions. Thus, androstan-11β-ol-17-one, upon reaction with about three moles of sodium acetylide followed by treatment with about three moles of acetic anhydride will yield 17α-ethinylandrostane-11β,17β-diol 17-acetate.

Starting compounds possessing a Δ⁴-3-keto moiety, e.g. 19-nor-4-androstene-3,17-dione and 6α-fluoro-4-androsten-3,17-dione, are preferably converted to the corresponding alkyl enol-ether derivative prior to alkynation and esterification in order to obtain the coresponding 17α-alkynyl-17β-lower alkanoyloxy-4-androsten-3-one. Thus, 19-nor-4-androstene - 3,17 - dione and 6α - fluoro - 4 - androsten - 3, 17-dione, upon treatment with ethyl orthoformate in dioxane in the presence of acid, accordng to known procedures, are each converted to the corresponding ethyl enol-ether intermediate, i.e. 3-ethoxy-19-nor-3,5-androstadien-17-one and 3-ethoxy-6-fluoro-3,5-androstadien-17-one, respectively, which, upon reaction with sodium acetylide in dimethylformamide followed by the in situ addition of acetic anhydride, yields 3-ethoxy-17α-ethinyl-19-nor-3,5-androstadien-17β-ol 17-acetate and 3-ethoxy-6-fluoro-3,5-androstadien-17β-ol 17-acetate, respectively. Treatment of the foregoing with dilute hydrochloric acid in aqueous methanol regenerates the 3-keto-Δ⁴-system and there is formed 17α-ethinyl-19-nor-4-androsten-17β-ol-3-one 17-acetate (17α-ethinyl-19-nor-testosterone 17-acetate—the known progestational agent, Norlutate) and 6α-fluoro-17α-ethinyl-4-androsten-17β-ol-3-one 17-acetate.

In order to prepare 17α-alkynyl-17β-lower alkanoyloxy androstanes having a 3-keto-Δ¹,⁴- system from the corresponding 3,17-diketo-Δ¹,⁴- androstane by my process, it is preferable to utilize an ethereal solvent such as tetrahydrofuran and dioxane. Thus, for example, reaction of 1,4-androstadiene-3,17-dione with sodium acetylide in tetrahydrofuran followed by the in situ addition of acetic anhydride will yield 17α-ethinyl-1,4-androstadien-17β-ol-3-one 17-acetate.

In general, without effecting the course of my process (i.e. the concomitant formation of a 17α-alkynyl-17β-alkanoyloxy steroid from a 17-keto precursor), the starting 17-keto-androstanes and 17-keto-estranes may have double bonds present in the steroidal nucleus such as at C-1 and C-4 (subject to special treatment as described hereinabove), at C-6, C-7, C-8, C-9(11) and C-11; methyl and hydroxy substituents and derivatives thereof (e.g. esters and ethers) such as at C-4, C-6, C-7, and C-11; fluoro, as at C-6; and keto groups such as at C-3 (in a Δ⁴- and Δ¹,⁴- A-ring) and at C-11. Unprotected keto groups present other than at C-3 and/or C-11 will undergo competing alkynation reactions to form the corresponding alkynated derivatives. Thus, androsane-3,17-dione upon treatment with sodium acetylide in dimethylformamide followed by the in situ addition of acetic anhydride will yield 3,17-bis-ethinyl-androstane-3,17β-diol diacetate.

When preparing a 9α-halogeno-11β-hydroxy-17α-alkynyl-17β-alkanoyloxy-androstane or estrane, the substituents at C-17 are preferably introduced prior to those at C-9 and C-11. Thus, 4,9(11)-androstadiene-3,17-dione after conversion to the corresponding 3-ethyl-enol-ether followed by treatment of the 3-ethoxy-3,5,9(11)-androstatrien-17-one thereby formed with sodium acetylide in dimethylformamide and the in situ addition of acetic anhydride, yields 3-ethoxy-17α-ethinyl-3,5,9(11)-androstatrien-17β-ol 17-acetate convertible by treatment with acid to 17α-ethinyl-4,9(11)-androstadien-17β-ol 17-acetate. Treatment of the foregoing with hypobromous acid according to known procedures yields the corresponding 9α-bromo-11β-hydroxy derivative which is convertible to the 9β,11β-epoxy derivative, and thence upon reaction with hydrogen chloride or hydrogen fluoride is convertible to the corresponding 9α-chloro-11β-hydroxy and 9α-fluoro-11β-hydroxy derivatives of 17α-ethinyl-4-androsten-17β-ol 17-acetate, i.e. 9α-chloro-11β-hydroxy-17α-ethinyl-testosterone 17-acetate and 9α-fluoro-11β-hydroxy-17α-ethinyl-testosterone 17-acetate, respectively.

For purposes of illustration, the process of this invention is disclosed in detail below. It is to be understood that the examples are merely illustrative of the process and are not to be construed as limiting the invention. Obvious equivalents will be apparent to one skilled in the art and the invention is to be limited only by the appended claims.

Example 1.—3-methoxy-17α-ethinyl-2,5(10)-estradien-17β-ol 17-acetate (A) To a solution of 40 g. of 3-methoxy-2,5(10)-estradien-17-one in 800 ml. of dimethylformamide under an atmosphere of argon, add 13.4 g. of sodium acetylide. Stir at room temperature for 15 minutes, then add rapidly 19.76 ml. of acetic anhydride. Stir at room temperature for one minute, then pour into eight liters of water containing 240 g. of sodium chloride. Continue stirring under an atmosphere of argon for two hours. Collect by filtration the resulting precipitate comprising 3-methoxy-17α-ethinyl-2,5(10)-estradien-17β-ol 17-acetate. Purify by crystallization under an atmosphere of nitrogen from aqueous methanol containing a drop of pyridine. M.P. 163–170° C. [α]$_D$+58.8° (dioxane).

In the above procedure, acetyl chloride may be substituted for acetic anhydride, and there is obtained 3-methoxy-17α-ethinyl-2,5(10)-estradien-17β-ol 17-acetate.

In the above procedure if, instead of acetic anhydride there is used an ahydride of other lower alkanoic acids such as propionic anhydride and normal butyric anhydride, there is obtained the corresponding 17-lower alkanoate ester, i.e. 3-methoxy-17α-ethinyl-2,5(10)-estradien-17β-ol 17-propionate and 3-methoxy-17α-ethinyl-2,5(10)-estradien-17β-ol 17-n-butyrate, respectively.

(B) To a solution of 0.5 g. of 3-methoxy-2,5(10)-estradien-17-one in 5 ml. of tetrahydrofuran, add 5 ml. of a mixture comprising 18 percent sodium acetylide in xylene. Stir under nitrogen at 25° C. for four hours. Add 1.6 ml. of acetic anhydride and stir at room temperature for 15 minutes. Pour the reaction mixture into ice water, then distill in vacuo to remove the xylene. Collect by filtration the resulting precipitate comprising 3-methoxy-17α-ethinyl-2,5(10)-estradien-17β-ol 17-acetate by filtration. Purify by crystallization from methanol containing a drop of pyridine.

(C) In a manner similar to that described in procedure 1A, treat 3-ethoxy-2,5(10)-estradien-17-one with sodium acetylide followed by acetic anhydride. Isolate and purify the resultant product in the described manner to give 3-ethoxy-17α-ethinyl-2,5(10)-estradien-17β-ol 17-acetate.

Example 2.—17α-ethinyl-4-estren-17β-ol-3-one 17-acetate (17α-ethinyl-19-nor-testosterone 17acetate)

(A) Dissolve 1 g. of 3-methoxy-17α-ethinyl-2,5(10)-estradien-17β-ol 17-acetate in 180 ml. of methanol and 20 ml. of water. Add 1.25 ml. of concentrated hydrochloric acid, heat to reflux temperature, then allow the reaction mixture to cool to room temperature. After a period of about three hours, pour the methanol solution into water and collect by filtration the resulting precipitate comprising 17α-ethinyl-4-estren-17β-ol-3-one 17-acetate.

In a similar manner, treat each of 3-methoxy-17α-ethinyl-2,5(10)-estradien-17β-ol 17-propionate and 3-methoxy-17α-ethinyl-2,5(10)-estradien-17β-ol 17-n-butyrate with hydrochloric acid in methanol. Isolate the resultant product in the manner described above to obtain, respectively, 17α-ethinyl-4-estren-17β-ol-3-one 17-propionate and 17α-ethinyl-4-estren-3-one 17-n-butyrate.

Alternatively, the compound of this example may be prepared as described below in procedures 2B and 2C.

(B) 17α - ethinyl - 5(10) - estren - 17β - ol - 3 - one 17-acetate.—Suspend 19 g. of 3-methoxy-17α-ethinyl-2,5(10)-estradiene-17β-ol 17-acetate in 1634 ml. of methanol and 324.9 ml. of water. Add 19 g. of oxalic acid. Stir the reaction mixture until a complete solution is obtained, and for an additional 30 minutes (total reaction time approximately 1.5 hours). Pour the reaction mixture into 16 liters of water and collect by filtration, the resulting precipitate comprising 17α-ethinyl-5(10)-estren-17β-ol-3-one 17-acetate.

(C) 17α-ethinyl-4-estren-17β-ol-3-one 17-acetate.— To a solution of 1 g. of 17α-ethinyl-5(10)-estren-17β-ol-3-one 17-acetate in 180 ml. of methanol and 20 ml. of water, add 1.25 ml. of concentrated hydrochloric acid, heat to reflux temperature, then cool to room temperature. After about three hours, pour the reaction mixture into water and collect by filtration the resulting precipitate comprising 17α-ethinyl-4-estren-17β-ol-3-one 17-acetate.

In a similar manner to that described in procedures B and C above, treat each of 3-methoxy-17α-ethinyl-2,5-(10)-estradien-17β-ol 17-propionate and 3-methoxy-17α-ethinyl-2,5(10)-estradien-17β-ol 17-n-butyrate in methanol with oxalic acid, and isolate the resultant respective products comprising 17α-ethinyl-5(10)-estren-17β-ol-3-one 17-propionate and 17α-ethinyl-5(10)-estren-17β-ol-3-one 17-n-butyrate. Treatment of each of the foregoing esters with methanolic hydrochloric acid according to Procedure 2C yields respectively 17α-ethinyl-4-estren-17β-ol-3-one 17-propionate and 17α-ethinyl-4-estren-17β-ol-3-one 17-n-butyrate.

Example 3.—10-hydroperoxy-17α-ethinyl-4-estren-17β-ol-3-one 17-acetate

Dissolve 13 g. of 17α-ethinyl-5(10)-estren-17β-ol-3-one 17-acetate (the compound of Example 2B) in 200 ml. of carbon tetrachloride. Pass oxygen through the solution while illuminating the solution with four fluorescent lights (four watts each). A precipitate slowly forms. Collect the resultant precipitate after 20, 30 and 95 hours. Chromatograph the combined precipitate over 400 g. of silica gel eluting with increasing percentages of ethyl acetate in chloroform. Combine the like fractions as determined by thin layer chromatography and by infrared and ultraviolet spectra data. Evaporate the combined fraction in vacuo to a residue comprising 10-hydroperoxy-17α-ethinyl-4-estren-17β-ol-3-one 17-acetate. Purify by crystallization from aqueous methanol. M.P. 178–180° C. [α]$_D$ —29° (dioxane).

Similarly, in the above procedure by substituting 17α-ethinyl-5(10)-estren-17β-ol-3-one 17-acetate the corresponding 17-propionate and n-butyrate ester thereof, there is obtained 10-hydroperoxy-17α-ethinyl-4-estren-17β-ol-3-one 17-propionate and 10-hydroperoxy-17α-ethinyl-4-estren-17β-ol-3-one 17-n-butyrate, respectively.

Example 4.—10-hydroperoxy-17α-ethinyl-4-estrene-3β,17β-diol 17-acetate and the 3α-epimer thereof To a solution of 50 mg. of 10-hydroperoxy-17α-ethinyl-4-estren-17β-ol-3-one 17-acetate in 105 ml. of methanol at room temperature, add 10 mg. of sodium borohydride in 10 ml. of methanol. Stir at room temperature for 90 minutes, then cautiously add glacial acetic acid dropwise until the reaction mixture is about pH 7. Concentrate the reaction mixture in vacuo to a residue comprising 10-hydroperoxy - 17α - ethinyl - 4 - estrene - 3β,17β - diol 17-acetate and the 3α-hydroperoxy epimer thereof.

Purify by dissolving the residue in ethyl acetate, washing the organic layer successively with dilute sodium bicarbonate, then water. Evaporate the ethyl acetate solution to a residue, then crystallize the residue from chloroform to give 10-hydroperoxy-17α-ethinyl-4-estrene-3β,17β-diol 17-acetate.

To obtain the 3α-epimer thereof, evaporate the chloroform filtrate containing 10-hydroperoxy-17α-ethinyl-4-estrene-3,17-diol 17-acetate and crystallize the resultant precipitate with acetone-hexane to obtain 10-hydroperoxy-17α-ethinyl-4-estrene-3α,17β-diol 17-acetate.

Example 5.—3-methoxy-17α-ethinyl-1,3,5(10)-estratrien-17β-ol 17-acetate and analogs thereof In a manner similar to that described in Example 1, treat 3-methoxy-1,3,5(10)-estratrien-17-one (estrone methyl ether) in dimethylformamide under an atmosphere of nitrogen with sodium acetylide followed by acetic anhydride. Isolate the resultant product in a manner similar to that described in Example 1 to obtain 3-methoxy-17α-ethinyl-1,3,5(10)-estratrien-17β-ol 17-acetate.

In a similar manner, treat each of the following with sodium acetylide in dimethylformamide followed by acetic anhydride in the above described manner.
1-methyl-3-methoxy-1,3,5(10)-estratrien-17-one,
2-methyl-3-methoxy-1,3,5(10)-estratrien-17-one,
1,2-dimethyl-3-methoxy-1,3,5(10)-estratrien-17-one,
1,2-dimethyl-3-methoxy-1,3,5(10),6-estratetraen-17-one,
1-methyl-3-methoxy-1,3,5(10),6-estratetraen-17-one,
2,3-di-methoxy-1,3,5(10)-estratrien-17-one,
3-methoxy-16β-methyl-1,3,5(10)-estratrien-17-one,
3-methoxy-1,3,5(10),6-estratetraen-17-one,
3-methoxy-6β-methyl-1,3,5(10)-estratrien-17-one,
3-methoxy-6-methyl-1,3,5(10),6-estratetraen-17-one,
3-methoxy-1,3,5(10),9(11)-estratetraen-17-one,
3-methoxy-1,3,5(10),6,8-estrapentaen-17-one, and
3-methoxy-1,3,5(10),7-estratetraen-17-one.

Isolate the respective resultant products in a manner similar to that described in Example 1 to obtain
1-methyl-3-methoxy-17α-ethinyl-1,3,5(10)-estratrien-17β-ol 17-acetate,
2-methyl-3-methoxy-17α-ethinyl-1,3,5(10)-estratrien-17β-ol 17-acetate,
1,2-dimethyl-3-methoxy-17α-ethinyl-1,3,5(10)-estratrien-17β-ol 17-acetate,
1,2-dimethyl-3-methoxy-17α-ethinyl-1,3,5(10),6-estratetraen-17β-ol 17-acetate,
1-methyl-3-methoxy-17α-ethinyl-1,3,5(10),6-estratetraen-17β-ol 17-acetate,
2,3-di-methoxy-17α-ethinyl-1,3,5(10)-estratrien-17β-ol 17-acetate,
3-methoxy-16β-methyl-17α-ethinyl-1,3,5(10)-estratrien-17β-ol 17-acetate,
3-methoxy-17α-ethinyl-1,3,5(10),6-estratetraen-17β-ol 17-acetate,
3-methoxy-6β-methyl-17α-ethinyl-1,3,5(10)-estratrien-17β-ol 17-acetate,
3-methoxy-6-methyl-17α-ethinyl-1,3,5(10),6-estratetraen-17β-ol 17-acetate,
3-methoxy-17-ethinyl-1,3,5(10),9(11)-estratetraen-17β-ol 17-acetate,
3-methoxy-17α-ethinyl-1,3,5(10),6,8-estrapentaen-17β-ol 17-acetate, and
3-methoxy-17α-ethinyl-1,3,5(10),7-estratetraen-17β-ol 17-acetate.

In the above procedure, if there is used an anhydride of other lower alkanoic acids such as propionic anhydride and caproic anhydride, there is obtained the corresponding 17-alkanoate acids, i.e., the 17-propionate and 17-caproate, respectively, of each of the above listed compounds.

Example 6.—17α-ethinyl-4-androsten-17β-ol-3-one 17-acetate (A) 3-ethoxy - 17α - ethinyl - 3,5 - androstadien-17β-ol 17 - acetate.—The requisite starting material, i.e., 3-ethoxy - 3,5 - androstadien - 17 - one is prepared according to known procedures via the action of ethyl orthoformate on 4 - androstene - 3,17 - dione in dioxane in the presence of ethanol and a strong acid such as sulfuric acid or p-toluene sulfonic acid.

To a solution of 2 g. of 3 - ethoxy - 3,5 - androstadien-17-one in 40 ml. of dimethylformamide under an atmosphere of nitrogen, add 0.69 g. of sodium acetylide. Stir at room temperature for 20 minutes, then add 1.1 ml. of acetic anhydride. Stir at room temperature for two minutes, then pour into 400 ml. of water containing 12 g. of sodium chloride. Filter the resulting precipitate comprising 3 - ethoxy - 17α - ethinyl - 3,5 - androstadien-17β-ol 17-acetate. Purify by crystallization from methanol containing a drop of pyridine.

In the above procedure, if propionic anhydride is substituted for acetic anhydride, there is obtained 3 - ethoxy-17α-ethinyl-3,5-androstadien-17β-ol 17-propionate.

(B) 17α-ethinyl - 4 - androsten - 17β - ol - 3 - one 17-acetate (17α - ethinyl-testosterone acetate).—Add 1 g. of 3-ethoxy - 17α - ethinyl - 3,5 - androstadien - 17β - ol 17-acetate to a solution comprising 190 ml. of methanol, 20 ml. of water, and 1.27 ml. of concentrated hydrochloric acid under an atmosphere of nitrogen. Allow this reaction mixture to stand under nitrogen at room temperature for three hours, then pour into water. Filter the resulting precipitate comprising 17α - ethinyl - 4 - androsten - 17β - ol - 3 - one 17-acetate. Purify by crystallization from acetone-hexane.

In a similar manner, treat 3 - ethoxy - 17α - ethinyl- 3,5 - androstadien - 17β - ol 17 - propionate with an aqueous methanolic hydrochloric acid solution. Isolate the resultant product in the described manner to obtain 17α-ethinyl-4-androsten-17β-ol-3-one 17-propionate.

(C) In a manner similar to that described in Example 6A, treat each of the following with ethyl orthoformate in dioxane in the presence of ethanol and p-toluene sulfonic acid: 19 - nor - 4 - androstene - 3,17 - dione, 16β-methyl - 19 - nor - 4 - androstene - 3,17 - dione, 4-androstene - 3,11,17 - trione, and 19 - nor - 4 - androsten-3,11,17 - trione, and there is obtained their respective ethoxy enol ethers, namely, 3-ethoxy-19-nor-3,5-androstadien-17-one,
3-ethoxy-16β-methyl-19-nor-3,5-androstadien-17-one,
3-ethoxy-3,5-androstadiene-11,17-dione, and
3-ethoxy-19-nor-3,5-androstadiene-11,17-dione.

In a manner similar to that described in the second paragraph of Example 6A, treat each of the foregoing ethoxy enol ethers with sodium acetylide in dimethylformamide under nitrogen followed by acetic anhydride. Isolate the respective resultant products in a manner similar to that described to obtain 3-ethoxy-17α-ethinyl-19-nor-3,5-androstadien-17β-ol 17-acetate,
3-ethoxy-16β-methyl-17α-ethinyl-19-nor-3,5-androstadien-17β-ol 17-acetate,
3-ethoxy-17α-ethinyl-3,5-androstadiene-17β-ol-11-one 17-acetate, and
3-ethoxy-17α-ethinyl-19-nor-3,5-androstadien-17β-ol-11-one 17-acetate.

In a manner similar to that described in Example 6B, treat each of the foregoing 3 - ethoxy - 17α - ethinyl-3,5 - androstadienes with aqueous methanolic hydrochloric acid, and isolate the resultant product in a manner similar to that described to obtain, respectively, 17α-ethinyl-19-nor-4-androsten-17β-ol-3-one 17-acetate (i.e., 17α-ethinyl-19-nor-testosterone 17-acetate),
16β-methyl-17α-ethinyl-19-nor-4-androsten-17β-ol-3-one 17-acetate,
17α-ethinyl-4-androsten-17β-ol-3,11-dione 17-acetate, and
17α-ethinyl-19-nor-4-androsten-17β-ol-3,11-dione 17-acetate.

Example 7.—17α-ethinyl-17β-acetoxy derivatives of hydroxylated androstanes and estranes Treat 40 g. of each of the following with dimethylformamide under an atmosphere of argon with sodium acetylide in the manner described in Example 1A followed by treatment with acetic anhydride, the quantity of acetic anhydride being approximately twice that used in Example 1 (i.e. around 39 ml.).

5-androsten-3β-ol-17-one,
4-androsten-3β-ol-17-one,
5-androsten-3α-ol-17-one,
5-androstene-1α,3β-diol-17-one,
1,3,5(10)-estratrien-3-ol-17-one,
1-methyl-1,3,5(10)-estratrien-3-ol-17-one,
1,2-dimethyl-1,3,5(10)-estratrien-3-ol-17-one,
1,2-dimethyl-1,3,5(10),6-estratetraen-3-ol-17-one,
1-methyl-1,3,5(10),6-estratetraen-3-ol-17-one,
1,3,5(10),6-estratetraen-3-ol-17-one,
6β-methyl-1,3,5(10)-estratrien-3-ol-17-one,
6-methyl-1,3,5(10),6-estratetraen-3-ol-17-one,
1,3,5(10),6,8-estrapentaen-3-ol-17-one,
1,3,5(10),7-estratetraen-3-ol-17-one, and
6β-methyl-1,3,5(10)-estratriene-3,7α-diol-17-one.

Isolate the respective resultant products in a manner similar to that described in Example 1A to obtain 17α-ethinyl-5-androstene-3β,17β-diol diacetate,
17α-ethinyl-4-androstene-3β,17β-diol diacetate,
17α-ethinyl-5-androstene-3α,17β-diol diacetate,
17α-ethinyl-5-androstene-1α,3β,17β-triol triacetate,
17α-ethinyl-1,3,5(10)-estratriene-3,17β-diol diacetate,
1-methyl-17α-ethinyl-1,3,5(10)-estratriene-3,17β-diol diacetate,
1,2-dimethyl-17α-ethinyl-1,3,5(10)-estratriene-3,17β-diol diacetate,
1,2-dimethyl-17α-ethinyl-1,3,5(10),6-estratetraen-3,17β-diol diacetate,
1-methyl-17α-ethinyl-1,3,5(10),6-estratetraen-3,17β-diol diacetate,
17α-ethinyl-1,3,5(10),6-estratetraene-3,17β-diol diacetate,
6β-methyl-17α-ethinyl-1,3,5(10)-estratriene-3,17β-diol diacetate,
6-methyl-17α-ethinyl-1,3,5(10),6-estratetraene-3,17β-diol diacetate,
17α-ethinyl-1,3,5(10),6,8-estrapentaene-3,17β-diol diacetate,
17α-ethinyl-1,3,(10),7-estratetraene-3,17β-diol diacetate, and
6β-methyl-17α-ethinyl-1,3,5(10)-estratriene-3,7α,17β-triol triacetate.

In the above procedure, if, instead of acetic anhydride, there are used anhydrides of other lower alkanoic acids such as propionic anhydride and butyric anhydride, there is obtained the correspoding poly-lower alkanoic esters, namely the di- (or tri-) propionate, and the di- (or tri-) butyrate esters, respectively.

Example 8.—17α-ethinyl-5-androstene-3β,17β-diol 17-acetate (A) 5-androsten-3β-ol - 17 - one 3 - tetrahydropyroanyl ether.—To a mixture of 1. g. of 5-androsten-3β-ol-17-one in 50 ml. of ether and 1 g. of 2,3 dihydropyran, add four drops of a prepared solution of p-toluene sulfonic acid (1 g.) in 100 ml. of ether. Allow the reaction mixture to stand at room temperature for four days, then add an additional 0.7 g. of 2,3-dihydropyran and three drops of p-toluene sulfonic acid solution in ether (prepared as described above). Allow the solution to stand at room temperature for an additional three days, then wash the ethereal reaction mixture with dilute aqueous sodium bicarbonate. Dry the ethereal solution over magnesium sulfate. Evaporate to a residue. Add hexane to the residue, and filter the resultant precipitate comprising 5-androsten-3β-ol-17-one-3-tetrahydropyranyl ether, which is used without further purification in procedure 8B immediately following.

(B) 17α-ethinyl-5-androstene-3β,17β-diol 3-tetrahydropyranyl ether 17-acetate.—To a solution of 1 g. of 5-androsten-3β-ol-17-one 3-tetrahydropyranyl ether in 30 ml. of dimethylformamide under an atmosphere of argon, add 0.34 g. of sodium acetylide. Stir at room temperature for 25 minutes, then add 0.51 ml. of acetic anhydride. Stir at room temperature five minutes, then pour into a saturated aqueous solution of sodium chloride. Collect by filtration the resulting precipitate comprising 17α-ethinyl-5-androstene-3β,17β-diol 3-tetrahydropyranyl 17-acetate.

(C) 17α-ethinyl-5-androstene-3β,17β-diol 17-acetate.—Dissolve 0.2 g. of 17α-ethinyl-5-androstene-3β,17β-diol 3-tetrahydropyranyl ether 17-acetate in 40 ml. of ethanol, 2.5 ml. of water, and 1 ml. of concentrated hydrochloric acid. Allow the solution to remain at room temperature for 18 hours, then add water and filter the resultant precipitate comprising 17α - ethinyl-5-androstene-3β,17β-diol 17-acetate. Purify by crystallization from acetate-hexane. Alternatively, the compound of this example is prepared in the following manner: To 3 g. of 17α-ethinyl-5-androstene-3β,17β-diol diacetate (prepared as described in Example 7), add 0.5 g. of sodium carbonate in 100 ml. of methanol-water (9:1). Allow the reaction to stand at room temperature for five hours, then dilute with water, and add hydrochloric acid dropwise to bring the solution to about pH 5. Filter the resultant precipitate comprising 17α-ethinyl-5-androstene-3β,17β-diol 17 - acetate. Purify by crystallization from acetone-hexane.

(D) In a manner similar to that described in procedure

11

8A, treat each of 5-androsten-3α-ol-17-one, and 4-androsten-3β-ol-17-one with 2,3-dihydropyran in ether in the presence of p-toluene sulfonic acid to obtain, respectively, 5-androsten-3α-ol-17-one 3-tetrahydropyranyl ether and 4-androsten-3β-ol-17-one 3-tetrahydropyranyl ether. In the manner described in procedure 8B, treat each of the foregoing tetrahydropyranyl ethers with sodium acetylide in dimethylformamide followed by acetic anhydride to obtain, respectively, 17α-ethinyl-5-androstene-3α,17β-diol 3-tetrahydropyranyl ether 17-acetate, and 17α-ethinyl-4-androstene-3β,17β-diol 3-tetrahydropyranyl ether 17-acetate. Treat each of the foregoing 17α-ethinyl androstene 3-dihydropyranyl ether derivatives with aqueous ethanolic hydrochloric acid in the manner described in Example 8C to obtain, respectively, 17α-ethinyl-5-androstene-3α,17β-diol 17-acetate, and 17α-ethinyl-4-androstene. 3β,17β-diol 17-acetate.

Example 9.—17α-Ethinyl-1,3,5(10)-estratriene-3,17β-diol 17-acetate (17α-ethinyl estradiol 17-acetate)

(A) 1,3,5(10) - estratrien-3β-ol-17-one 3 - tetrahydropyranyl ether.—In a manner similar to that described in Example 8A, treat 1,3,5(10)-estratrien-3-ol-17-one with 2,3-dihydropyranyl in ether in the presence of p-toluene sulfuric acid. Isolate the resultant product in a manner similar to that described to obtain 1,3,5(10)-estratrien-3-ol-17-one 3-tetrahydropyranyl ether.

(B) 17α-ethinyl-1,3,5(10)-estratriene-3,17β-diol 3-tetrahydroether 17-acetate.—In a manner similar to that described in Example 8B, treat 1,3,5(10)-estratrien-3-ol-17β-ol 3-tetrahydropyranyl ether with sodium acetylide in dimethylformamide followed by treatment with acetic anhydride. Isolate the resultant product in the manner similar to that described to obtain 17α-ethinyl-1,3,5(10)-estratriene-3,17β-diol 3-dihydropyranyl ether 17-acetate.

(C) 17α-ethinyl-1,3,5(10)-estratriene-3,17β - diol 17-acetate.—In a manner similar to that described in Example 8C, treat 17α-ethinyl-1,3,5(10)-estratriene-3,17β-diol 3-tetrahydropyranyl ether 17-acetate with aqueous ethanolic hydrochloric acid. Isolate and purify the resultant product in the described manner to obtain 17α-ethinyl-1,3,5(10)-estratriene-3,17β-diol 17-acetate.

Alternatively, the compound of this example is prepared as follows: Treat 17α-ethinyl-1,3,5(10)-estratriene-3,17β-diol diacetate (prepared as described in Example 7) with sodium carbonate in aqueous methanol in the manner described in the alternative procedure of Example 8C. Isolate and purify the resultant product in the described manner to obtain 17α-ethinyl-1,3,5(10)-estratriene-3,17β-diol 17-acetate.

Example 10.—6β-methyl-17α-ethinyl-1,3,5(10)-estratriene-3,7α,17β-triol-17-acetate To 1 g. of 6β-methyl-17α-ethinyl-1,3,5(10)-estratriene-3,7α,17β-triol triacetate (prepared as described in Example 7), add 0.23 g. of sodium hydroxide dissolved in 60 ml. of methanol-water (9:1). Allow the reaction mixture to stand at room temperature for two hours, then add hydrochloric acid dropwise until the solution is about pH 5. Extract the reaction mixture with chloroform. Combine the chloroform extracts and evaporate to a residue comprising 6β-methyl-17α-ethinyl-1,3,5(10) - estratriene-3,7α,17β-triol 17-acetate.

Example 11.—17α-ethinyl-androstane-11β,17β-diol 17-acetate

To a solution of 2.9 g. of androstan-11β-ol-17-one in 70 ml. of dimethylformamide under an atmosphere of argon, add 0.48 g. of sodium acetylide. Stir at room temperature for 15 minutes, then add rapidly 1.02 g. of acetic anhydride. Stir at room temperature for one minute, then pour into 500 ml. of water saturated with sodium chloride. Continue stirring under an atmosphere of argon for two hours, then collect by filtration the resultant

12 precipitate comprising 17α-ethinyl-androstane - 11β,17β-diol 17-acetate.

Example 12.—3-methoxy-17α-propynyl-2,5(10)-estradien-17β-ol 17-acetate

To a solution of 0.4 g. of 3-methoxy-2,5(10)estradien-17-one in 8.5 ml. of dimethylformamide under an atmosphere of nitrogen, add 0.136 g. of a sodium salt of methyl acetylene (i.e. the sodium salt of propyne) dispersed in xylene (prepared according to known procedures by placing propyne into a solution of liquid ammonia and sodium, and then displacing the ammonia with xylene). Stir at room temperature for 20 minutes, then add 0.21 ml. of acetic anhydride. Stir the reaction mixture for five minutes at room temperature, then pour the reaction mixture into an aqueous saturated sodium chloride solution. Extract the mixture with methylene chloride and evaporate the combined methylene chloride extracts to a residue comprising 3-methoxy-17α-propynyl-2,5(10) - estradien-17β-ol 17-acetate. Purify by crystallization from aqueous ethanol containing a drop of pyridine.

In the above procedure, if in place of acetic anhydride there is used the anhydride of other lower alkanoic acids, such as propionic and n-butyric anhydride, there is obtained the corresponding lower alkanoic acid ester, i.e. 3-methoxy-17α-propynyl-2,5(10)-estradien-17β-ol 17-propionate, and 3-methoxy-17α-propynyl-2,5(10) - estradien-17β-ol 17-butyrate, respectively.

I claim:

1. A process for preparing a 17α-alkynyl-17β-alkanoyloxy steroid of the androstane and estrane series which comprises treating a 17-keto steroid of the androstane and estrane series with an alkali metal acetylide; adding in situ to the 17α-alkynyl-17β-hydroxy metal salt intermediate thereby formed an acylating agent selected from the group consisting of a lower alkanoyl anhydride and a lower alkanoyl halide; and treating said metal salt intermediate with said acylating agent for less than an hour at temperatures up to 50° C.

2. The process of claim 1 when carried out in an N,N-disubstituted lower alkanoic acid amide.

3. The process of claim 1 when carried out in tetrahydrofuran.

4. The process of claim 1 wherein said alkali metal acetylide is sodium acetylide.

5. The process of claim 1 wherein said alkali metal acetylide is sodium acetylide and wherein said acylating agent is a lower alkanoic anhydride.

6. The process of claim 1 wherein said alkali metal acetylide is sodium acetylide and wherein said acylating agent is a lower alkanoyl halide.

7. The process of claim 1 when carried out in dimethylformamide and wherein said alkali metal acetylide is sodium acetylide and wherein said acylating agent is a lower alkanoic anhydride.

8. The process according to claim 7 wherein said lower alkanoic anhydride is acetic anhydride.

9. A process for preparing 3-alkoxy-17α-alkynyl-17β-alkanoyloxy-2,5(10)-estradiene which comprises treating 3-alkoxy-2,5(10)-estradien-17-one with an alkali metal acetylide; and adding in situ to the 17α-alkynyl-17β-hydroxy metal salt intermediate thereby formed an acylating agent selected from the group consisting of a lower alkanoyl anhydride and a lower alkanoyl halide.

10. A process according to claim 9 when carried out in dimethylformamide and wherein said 3-alkoxy-2,5(10)-estradien-17-one is 3-methoxy-2,5(10)-estradien-17-one, said alkali metal acetylide is sodium acetylide, said acylating agent is acetic anhydride, and wherein said 3-alkoxy-17α-alkynyl-17β-alkanoyloxy-2,5(10)-estradiene prepared is 3 - methoxy - 17α-ethinyl-2,5(10)-estradien-17β-ol 17-acetate;

said process for preparing 3-methoxy-17α-ethinyl-2,5(10)-estradien-17β-ol 17-acetate comprising treating 3 - methoxy - 2,5(10)-estradien-17-one with sodium acetylide in dimethylformamide; and adding acetic anhydride in situ to the thereby formed 17α-ethinyl-17β-hydroxy sodium salt intermediate.

References Cited

UNITED STATES PATENTS

| | | | |
|---|---|---|---|
| 2,970,157 | 1/1961 | Cutler et al. | 260—397.45 |
| 3,072,646 | 1/1963 | Fried et al. | 260—239.55 |
| 3,072,686 | 1/1963 | Wettstein et al. | 260—397.4 |
| 3,076,829 | 2/1963 | Reimann et al. | 260—397.45 |
| 3,260,733 | 7/1966 | Foell et al. | 260—397.3 |

OTHER REFERENCES

Lowenthal, Letrohedion 6, pp. 269–303 (1959) (p. 300 relied on).

LEWIS GOTTS, *Primary Examiner.*

E. G. LOVE, *Assistant Examiner.*